O. TYBERG & L. LAKE.
MACHINE FOR REMOVING CIGAR BUNCHES FROM MOLDS.
APPLICATION FILED SEPT. 19, 1902.

947,871.

Patented Feb. 1, 1910.
5 SHEETS—SHEET 1.

O. TYBERG & L. LAKE.
MACHINE FOR REMOVING CIGAR BUNCHES FROM MOLDS.
APPLICATION FILED SEPT. 19, 1902.

947,871.

Patented Feb. 1, 1910.
5 SHEETS—SHEET 2.

WITNESSES:
Augusta White
Sydney J. Prescott

INVENTORS
Oluf Tyberg
Lion Lake
by Philipp Sawyer Rice & Kennedy
ATTORNEYS

O. TYBERG & L. LAKE.
MACHINE FOR REMOVING CIGAR BUNCHES FROM MOLDS.
APPLICATION FILED SEPT. 19, 1902.

947,871.

Patented Feb. 1, 1910.
5 SHEETS—SHEET 5.

WITNESSES:
Augusta White
Sydney J. Prescott

INVENTORS
Olaf Tyberg
Leon Lake
by Philipp, Sawyer, Rice & Kennedy
ATTORNEYS

UNITED STATES PATENT OFFICE.

OLUF TYBERG AND LEON LAKE, OF NEW YORK, N. Y., ASSIGNORS TO RUFUS L. PATTERSON AND GEORGE ARENTS, JR., OF NEW YORK, N. Y.

MACHINE FOR REMOVING CIGAR-BUNCHES FROM MOLDS.

947,871.   Specification of Letters Patent.   Patented Feb. 1, 1910.

Application filed September 19, 1902. Serial No. 123,980.

*To all whom it may concern:*

Be it known that we, OLUF TYBERG, a citizen of the United States, and resident of New York, county of Kings, and State of New York, and LEON LAKE, a citizen of the United States, and resident of New York, county of Kings, and State of New York, have invented certain new and useful Improvements in Machines for Removing Cigar-Bunches from Molds, fully described and represented in the following specification and the accompanying drawings, forming a part of the same.

This invention relates to certain improvements in machines for removing cigar bunches from molds.

In an application of Oluf Tyberg, filed March 28, 1901, No. 53,211, there is disclosed a machine in which cigar molds are presented in succession to a bunch removing means,—the specific form of said means illustrated in the said application being a series of impaling pins,—the molds opened, the bunches removed and the molds closed and discharged.

The present invention has for its object to produce an improved machine of the type disclosed in the application above referred to.

With this and other objects in view, the invention consists in certain constructions and in certain parts, improvements and combinations as will be hereinafter fully described and then specifically pointed out in the claims hereunto appended.

Figure 1:
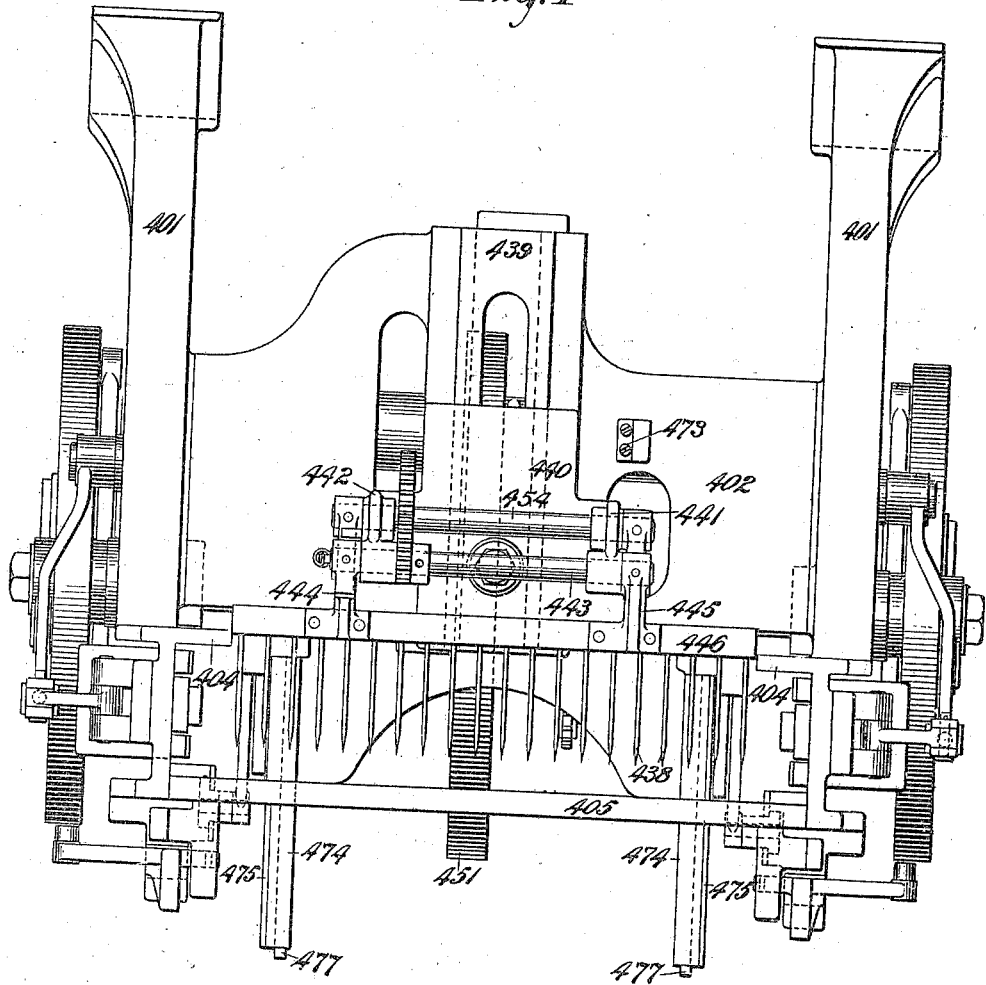
Figure 2:
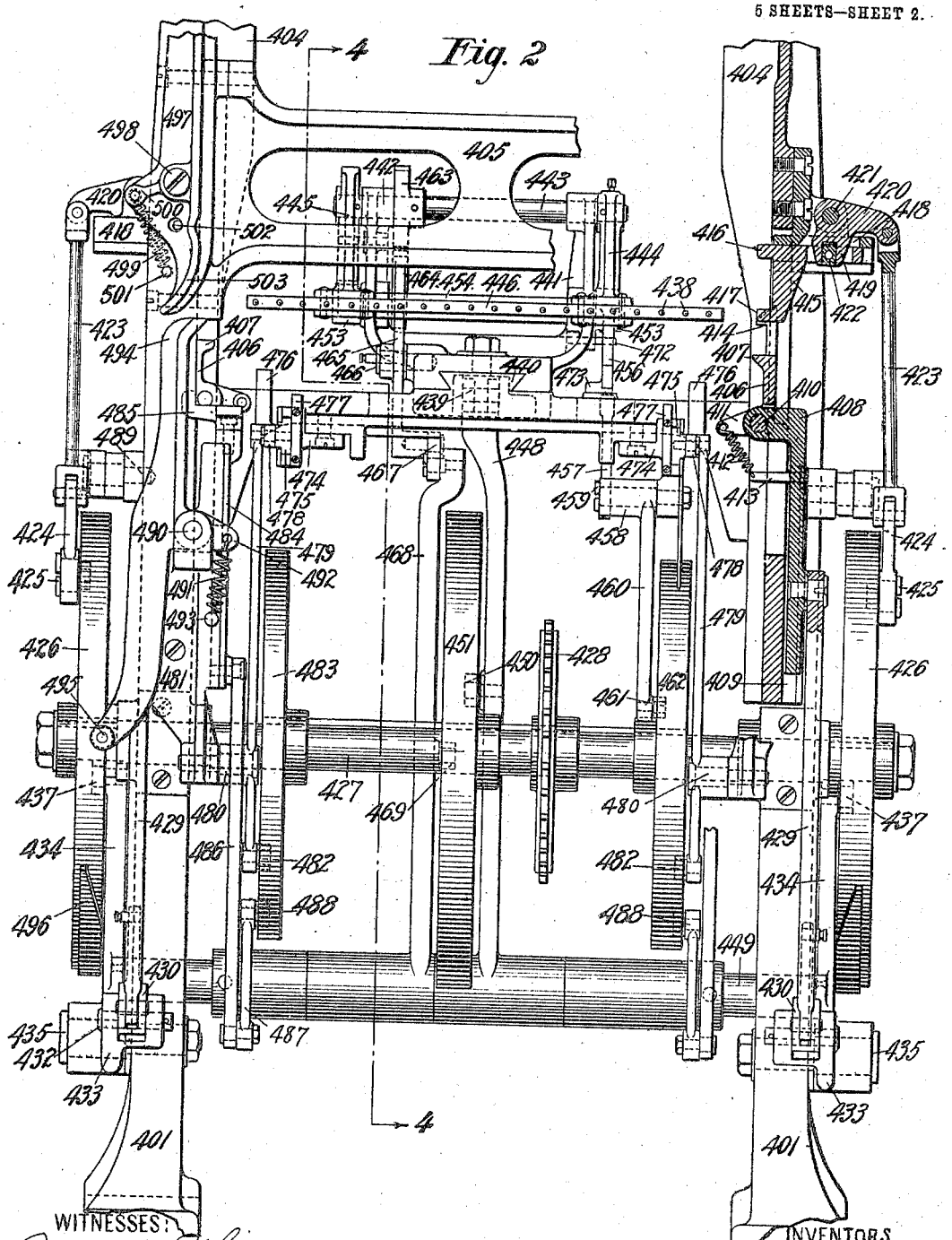
Figure 3:
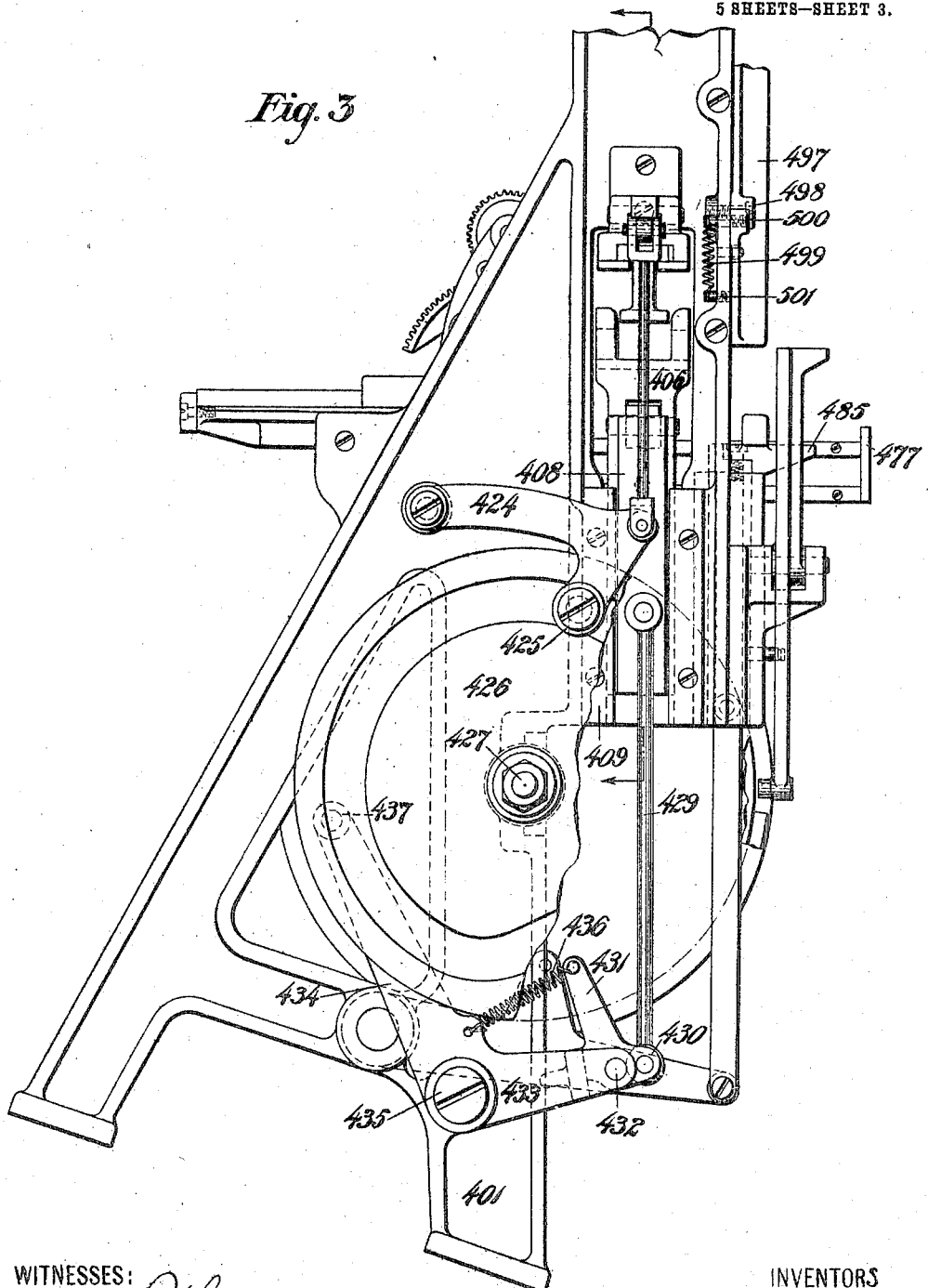
Figure 4:
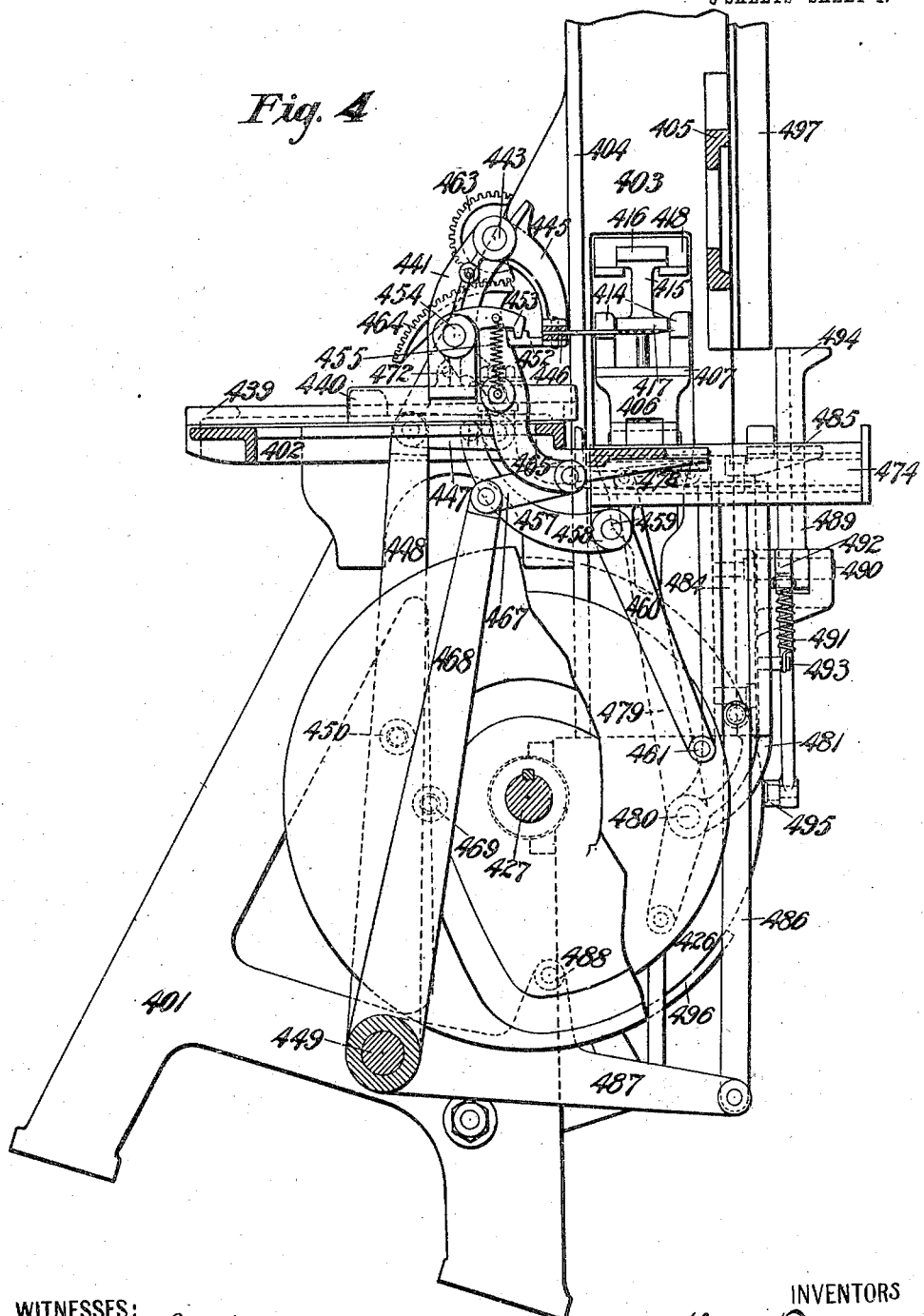
Figure 5:
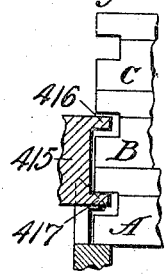

In the accompanying drawings in which like characters of reference indicate the same parts—Figure 1 is a plan view of the machine which has been selected to illustrate the invention. Fig. 2 is a front elevation of said machine, certain parts being shown in section. Fig. 3 is a side elevation of said machine, certain parts being broken away. Fig. 4 is a section on the line 4—4 of Fig. 2, and Figs. 5 to 18 are diagrammatic views illustrating the operation of the mechanism.

Referring to the drawings, which illustrate one embodiment of the invention, the side frames of the machine are indicated at 401, said frames serving to support a suitable bed, marked 402, upon which certain of the operating parts of the machine are carried. Inasmuch as the machine illustrated is designed to remove the bunches from a plurality of molds which are operated upon in succession, means are provided for maintaining the plurality of molds in position in the machine. Preferably, however, these means will be such as to maintain the molds to be operated upon in the form of a stack.

While the means for maintaining the stack of molds in position may be of any desired construction, as shown each of the side frames 401 is provided with recesses 403 which are bounded on their rear side by rectangular ribs 404. Extending across the machine from side frame to side frame is a cross bar 405, this bar in connection with the recesses and ribs in the side frames forming a guideway or chute in which a stack of molds may be supported.

The particular means for supporting the stack of molds in the guideway may be varied within wide limits. In the preferred form of the construction, however, these means will be of such a character as to permit the cigar bunches in the bottom mold of the stack to be engaged by the bunch removing means, the mold opened for the discharge of the bunches and then closed and transferred away from the stack, after which another mold comes into position to be operated upon. In the construction shown an abutment is employed upon which the stack of molds may at times rest. This abutment, in the construction illustrated, consists of two movable blocks 406, one of these blocks being located on each side of the machine and each of them being provided with a supporting shoulder 407. In the preferred form of the construction and as shown each of these blocks is pivoted on a slide 408 which is constructed to move in suitable ways 409 which may be formed on or secured to the side frames of the machine in any desired manner. The pivot by which each of the blocks is secured to its slide is marked 410 and each block, for reasons to be hereinafter stated, is preferably held in position by a spring. To this end, each of the blocks is formed with a projection 411 to which is secured a spring 412, the other end of said spring being secured to a pin 413 extending inward from the slide before referred to.

The supporting abutment which has just been described will in the preferred form of the construction be utilized not only for the purpose of at times supporting the stack of molds, but will also operate to separate the parts of the lowermost mold of the stack. To this end, suitable means are provided for retaining the lower part of the lowermost mold on the abutment. While the retaining means employed may be of any desired construction, as shown each block is provided with a pair of hooked projections 414, said projections being arranged with a space between them. These hooked projections are so constructed as to engage the space formed by the shoulders on the upper and lower parts of the ordinary two-part cigar mold now commercially used, and, in the machine shown, this engagement is effected by giving the projections and abutment an upward movement, the blocks 406 which form the abutment rocking against the stress of the springs 412 to permit this movement.

When, as in the construction illustrated the abutment is relied upon to separate the parts of the lowermost mold of the stack, it is obvious that means must be provided for sustaining in position the upper part of the lowermost mold and the molds in the stack above said part. While these means may be of any suitable description, in the construction shown, two supports 415 are employed for this purpose, these supports being in the form of slides and one of them being located on each side of the machine. In the construction shown, each of these supports or slides is formed with two engaging projections 416 and 417, and the slides move in ways 418 secured to the side frames. The projections 416 and 417 of the slides 415 are so spaced that when they are in operative position the projections 417 which form stack holders will take into the space between the upper and lower parts of the lowermost mold and the projections 416 will take into the same space in a mold above the lowermost mold and preferably the mold next above. The projections 417 are further of such a width as to pass into the space between the retaining projections 414 before described as formed on the abutment 406.

The means for operating the slides 415 may be of any desired description. As shown, there is provided on each side of a machine a pivoted bell crank 419, 420, pivoted at 421 in suitable bearings formed on the machine frame. The arm 419 of each bell-crank is slotted and engages a pivoted block 422 mounted in slots in the slides 415. The arms 420 of the bell-cranks are connected by links 423 to cam levers 424, said levers being pivoted on each side of the machine and being provided with the usual bowls 425 which engage grooves in cams 426. These cams 426 are mounted on the main shaft 427 of the machine, said shaft extending across the machine from side to side and being supported in suitable bearings in the side frames. This shaft may be driven in any suitable manner, but as shown is provided with a driving sprocket 428 which may be driven by a chain from any suitable source of power.

Figure 6:
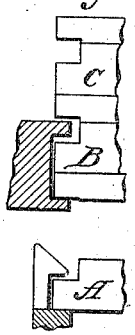
Figure 7:
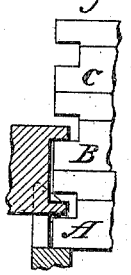
Figure 8:
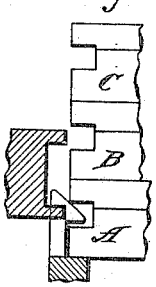
Figures 9, 10:
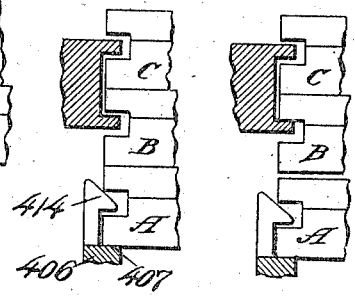
Figure 11:
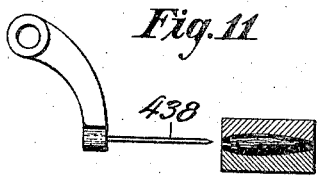
Figure 12:
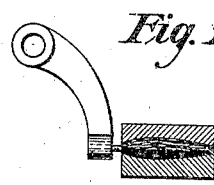
Figure 13:
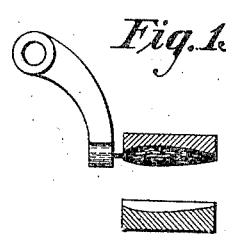
Figure 14:
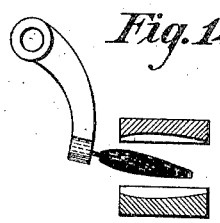
Figure 15:
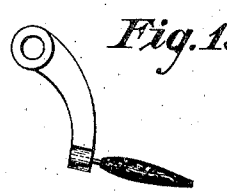
Figure 16:

It is apparent that when the stack of molds is in position in the machine with the lowermost mold resting on the shoulders 407 of the blocks 406 which form the abutment, the retaining projections 414 of these blocks will enter the space between the upper and lower portions of the mold which rests on the abutment. If, now, the sliding supports be moved inward, it is further apparent that the shoulders 417 of these supports will lie between the retaining projections 414 and enter the same spaces which these projections have entered, and that the shoulders 416 will enter similar spaces in the mold above. Attention is directed to the diagram, Fig. 5, in which the parts are shown in the position referred to. It is further apparent that if the blocks 406 which form the abutment are given a downward movement the lower part of the lowermost mold will be pulled downward away from the upper part of this mold, the upper part and the stack being sustained in position by the projections on the slides 415. This position of the parts is indicated in Fig. 6. It is obvious that when the parts of the mold are in this position the bunches may be removed by bunch removing means, a form of which will be hereinafter described, after which by moving the abutment upward the separated parts of the mold from which the bunches have been removed may be reunited, the projections 416 preventing the stack from rising as the parts of the mold are brought into engagement.

The movement of the blocks which compose the abutment is effected through their slides 408 and may be accomplished through any desired connections. These connections however, will preferably be of such a character as to allow them to yield in case a bunch should fail to be removed from the mold or the parts of the mold when they are to be reunited, fail to come truly into register. As shown, each of the slides 408 is connected by means of a link 429 to a bell-crank lever 430, 431, said bell-crank being pivoted by means of a pin 432 to one of the arms 433 of a bell-crank lever 433, 434 pivoted at 435 to the frame of the machine. The arms 431 of the bell-cranks 430, 431 are further connected by means of springs 436 to the arms 434 of the levers 433, 434. The arms 434 of the bell-cranks 433, 434 are provided with suitable bowls 437 which engage cam grooves formed in the inner faces of the cam disks 426 before described. It is apparent that with the construction which has just been described the slides 408 will be moved to give the abutment the movements desired, and further, that should the parts of the mold fail, for any reason, to come truly into register, or there be a cigar bunch interposed between them, the bell-cranks 430, 431 will rock on their pivots against the stress of the springs 436 and prevent any breakage either in the mold or in the connections.

The bunch removing means employed may be of any suitable character, but preferably will consist, as in the application referred to in the early part of this specification, of a series of impaling pins 438 which may be mounted and operated in any suitable manner. As shown, the bed plate 402 is provided with a dove-tailed guide 439 on which moves a slide 440 which is provided with a pair of upwardly extending arms 441, 442, said slide and arms forming a carriage. In the upper ends of the arms 441, 442 there is mounted a shaft 443 which has secured thereto a pair of arms 444, 445, said arms serving to support a cross bar 446 in which the pins 438 are secured. In the construction shown, the impaling pins are arranged to engage the bunches of the lowermost mold of the stack while said mold is in position in the stack, the present construction being distinguished in this respect from that shown in the application before referred to in which the lowermost mold is removed from the stack before the bunches are engaged by the pins.

When, as in the machine shown in the drawings, the pins engage the bunches in a mold which is in position in the stack, it is desirable to effect the engagement of the pins with the bunches by moving the pins. To this end, the carriage above referred to is given a movement toward the stack in order to cause the pins to impale the bunches, and is then, after the bunches have been impaled and the mold has been opened, given a movement away from the stack to carry the bunches away from the mold. The means by which the carriage is given the movements referred to may be of any desired description. As shown, the carriage is connected by means of a link 447 to a cam lever 448 which is pivoted on a bar or rod 449 extending across the machine, said rod being carried by the side frames. The lever 448 is provided with a cam stud 450 which engages a cam groove formed in a cam disk 451 mounted on the shaft 427.

When the impaling pins are given their forward movement to engage the bunches, it is desirable that they be held rigid. While this might be accomplished through the frictional engagement of the gearing hereinafter to be described by which the pins are operated, there will preferably be provided a locking device so that any unsteadiness resulting from wear or backlash in the gearing may be avoided. While this locking device may be of any desired construction, as shown the cross bar 446 has extending rearwardly therefrom notched arms 452, the notches in these arms being arranged to be engaged by the downwardly bent ends of locking arms 453, said arms being carried on a shaft 454 which is mounted in the carriage before referred to. The locking arms 453 may be held in operative position in any suitable manner, as by springs 455, and may be released in any suitable manner, as, for instance, by rocking the shaft 454. As shown, the shaft 454 is provided with a downwardly projecting arm 456 which is arranged to be struck by an arm 457 extending from a boss 458 suitably supported in the machine on a pin 459. This boss 458 has extending from it another arm 460 which is provided with the usual cam roller 461 which engages a cam slot in a cam 462 mounted on the shaft 427 before referred to.

After the impaling pins have been caused to engage the bunches in the mold and the parts of the mold have been separated, it is desirable to give the pins a movement which, in the construction illustrated, is downward, the object of which is to free the bunches from the mold. The means by which the pins are given the movement referred to will depend upon the construction employed for mounting and operating the pins. As shown, the shaft 443 is provided with a segment 463 which is engaged by a segment 464 formed on a segment lever 465 which is pivoted at 466 to the slide 440. The lower end of this segment lever is connected by means of a link 467 to a cam lever 468 which is mounted on the cross bar or rod 449 before referred to. This lever 468 is provided with a stud or roller 469 which engages a cam groove in the cam 451 before described.

In addition to giving the pins the downward movement referred to, the construction which has just been described is also relied upon to effect a movement of the pins which will bring the bunches into position to be discharged from the pins. The contour of the cam groove in the cam 451 is therefore such as to give the pins the downward movement referred to, after which the carriage moves back to move the bunches clear of the mold. During the backward movement of the carriage, the lever 468 also moves back, keeping the pins in the position in which they stop after the bunches are freed from the mold. After the carriage is moved back sufficiently to carry the bunches clear of the mold, the movement of the lever 468 is reversed, causing the shaft 443 to rock in the opposite direction, thus bringing the bunches into discharging position.

Figure 17:
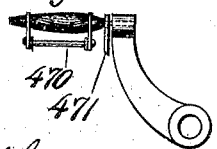
Figure 18:
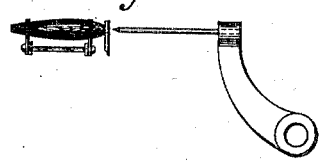

The operations referred to will be clear from consideration of the diagrams 5 to 18 inclusive, in which the successive positions of the parts of the mold and the pins are made clear. Fig. 17 shows the pins depositing the bunches in a carrier which as shown consists of a chain 470 which is or may be similar to that shown in the application hereinbefore referred to. After the bunches have been laid in the carrier, the carriage is given a forward movement to withdraw the pins therefrom, the withdrawing action being facilitated by a stripper plate 471 which is or may be similar to that shown in said application.

Before the pins are given the downward movement, the purpose of which is to free the bunches from the mold, the locking levers 453 are operated through the construction which has been described and are disengaged from the notched arms 452. After the locking levers have been disengaged and the pins moved downward the carriage starts on its backward movement. As the carriage moves back, the end of the arm 456 moves away from the end of the striker arm 457, allowing the springs 455 to pull the arms 453 down. This downward movement of the arms is, however, limited by means of a pin 472 which is mounted on the arm 441. The locking levers do not, however, at this time, engage the notched arms, for the reason that the notched arms are below them. When the carriage reaches its rearward position and the movement of the shaft 443 is reversed to bring the pins into the position in which they deposit the bunches, the notched arms 452 would be liable to strike the locking levers 453 if they were not moved out of the way. The bed is accordingly provided with a block 473 which is so located as to be struck by the arm 456 as the carriage reaches the end of its rearward movement. As the arm 456 strikes this block 473, the shaft 454 is rocked and the locking arms move upward so that as the pins swing over the notched projections 442 clear the locking arms. After the bunches have been removed from the mold, the parts of the mold are reunited as has been before described and as is indicated in the diagram, Fig. 7. The mold having been thus emptied and the parts reunited, may be discharged in any suitable manner. Preferably, however, a stacking mechanism is provided for the empty molds, and as each mold is emptied, it is transferred to this stacking mechanism.

The stacking and transferring mechanisms employed may be of any suitable construction. As shown, however, the bed 402 is provided on each side with a bracket 474, each of said brackets being provided with ways in which moves a slide 475. Each of these slides is provided with an upwardly extending projection 476, and the forward end of each of the brackets is provided with a stop lug 477. In their rearward position the slides are so located that as the stack of molds moves down the lowermost mold of the stack will rest upon the brackets, the projections 476 of each of the slides being behind the same. The slides are then given a forward movement which may be effected by any suitable mechanism. As shown, each of the slides has connected to it a link 478, these links being pivoted to cam levers 479 which in turn are pivoted at 480 to brackets 481 on the frame. The lower ends of these levers 479 are provided with cam rollers 482 which engage suitable cam grooves one of which is formed in the cam disk 462 before referred to and the other of which is formed in a cam 483 mounted on the shaft 427. After a mold has been deposited on the brackets and the slides have been given their forward movement, thus transferring the empty mold from the filled stack, the mold is lifted away from the brackets by a suitable mechanism which is provided for this purpose.

While this mechanism may be of any desired construction, as shown it consists of a pair of lifting slides 484, each of said slides being provided with a head 485. These slides may be operated in any desired manner. In the construction shown, the lower end of each slide is connected by means of a link 486 to a cam lever 487, said levers being mounted on the cross bar 449 before referred to. Each of these levers 487 has an upwardly projecting arm in which is mounted a cam roll 488, said rolls being arranged to engage suitable cam grooves, one of said grooves being formed in the cam disk 483 and the other in the cam disk 462. As the lifter slides complete their upward movement, the mold is taken by suitable sustaining devices which, while they may be varied in construction, preferably consist of a pair of pivoted pawls 489 pivoted at 490 to the brackets 481 before described and are held forward by means of spring 491 which are connected to projections 492 from the pawls and to studs 493 on the brackets 481. The operating ends 494 of these pawls normally extend inward, lying across the path which the mold takes as it is moved upward by the lifters. The rear ends of the pawls are provided with studs 495 which lie in the path of cams 496 mounted on the periphery of the cam disks 426 before described. These cams are so timed that they swing the rear end of the pawls inward and their operative ends 494 outward just as the mold is caused by the operation of the lifters to pass the ends 494. It will be understood, however, that the operative ends 494 of the pawls are serving to sustain a stack of molds, and the timing of the parts will, therefore, be so arranged as not to move the operative ends of the pawls out from underneath the stack until the mold which is being lifted by the lifters comes into position to sustain the weight of the stack, thereby avoiding any excessive drop of the stack.

It will be seen that the machine which has been described contemplates the transfers of molds as fast as they are emptied from the descending stack of filled molds to an ascending stack of molds and that the two stacks move in parallel lines and very close together. In the preferred form of the construction, guides will be provided for the ascending stack which will keep the molds which form it out of contact with the molds of the descending stack. With the construction as before described, these guides will necessarily partly overlie the space through which the filled molds are introduced into the guides which control the movement of the descending stack. Preferably, therefore, these guides will be of such a character as to automatically move out of the way when the empty stack is removed from them at which time a fresh supply of molds will be added to the descending stack. While the construction of these guides may be widely varied, as shown, they consist of two angular strips 497, these strips being pivoted at 498 to the side frames of the machine. Springs 499 are secured to projections 500 of the strips and to pins 501 on the frame. The movement of the guides produced by the springs is limited in any suitable manner, as, for instance, by a stop 502 mounted on the frame and extending through a perforation in the strips. The lower ends of the angular guides are preferably curved outward as indicated at 503. With the construction as before described, it will be seen that as a mold is lifted into the guides they will be turned on their pivots into operative position in which position they partially overlie the space through which filled molds are to be inserted into the machine. As long as there are any molds in the guides they will remain in the position referred to. When, however, the stack of molds is removed from the guides, the springs will swing them out of operative position and clear of the space through which the filled molds are to be introduced into the machine.

In the preferred form of the construction the entire machine will be tilted backward as is indicated in Figs. 3 and 4, so that there is no tendency for the ascending stack of empty molds to fall forward out of the machine.

While the construction which has been before described is the preferred one, it is to be understood that its details may be varied and that the invention may be embodied in constructions which differ widely therefrom. The invention is not, therefore, to be limited to the specific construction which has been hereinbefore described.

What is claimed is:—

1. The combination with means for sustaining a stack of two-part molds in position each of said molds being constructed to contain a plurality of bunches, of a bunch removing device, means for causing said device to engage the bunches of one of the molds while in the stack and thereafter remove them from the mold, and means for separating the parts of the mold, substantially as described.

2. The combination with means for sustaining a stack of two-part molds in position each of said molds being constructed to contain a plurality of bunches, of a bunch removing device, means for causing said device to engage the bunches of one of the molds while in the stack and thereafter remove them from the mold, means for separating the parts of the mold, means for uniting the parts of the mold after the bunches have been removed, and means for discharging the mold from the stack, substantially as described.

3. The combination with means for sustaining a stack of two-part molds in position, each of said molds being constructed to contain a plurality of bunches, of a bunch removing device, said device including a plurality of impaling pins, means for moving said device to cause the pins to impale the bunches in one of the molds while in the stack and thereafter remove them from the mold, and means for separating the parts of the mold, substantially as described.

4. The combination with means for sustaining a stack of two-part molds in position each mold being constructed to contain a plurality of bunches, of a bunch removing device said device including a plurality of impaling pins, means for moving said device to cause the pins to impale the bunches in one of the molds while said mold is in position in the stack and thereafter remove the bunches from the mold, means for separating the parts of the mold having its bunches still engaged, means for uniting the parts of the mold after the bunches have been removed, and means for discharging the mold from the stack, substantially as described.

5. The combination with a frame, of means for supporting a stack of filled bunch molds therein, means for supporting a stack of empty bunch molds, a device for removing the bunches from the molds, and means for transferring the molds from which the bunches have been removed from the filled stack supporting means to the empty stack supporting means, substantially as described.

6. The combination with a frame, of means for supporting a stack of two-part filled bunch molds, means for supporting a stack of empty molds, means for opening and closing the filled molds in succession, a bunch removing device, and means for transferring the molds that have been emptied from the supporting means for the stack of filled molds to the supporting means for the stack of empty molds, substantially as described.

7. The combination with a frame, of means for supporting a stack of filled bunch molds therein, means for supporting a stack of empty bunch molds, a bunch removing device said device including a plurality of impaling pins, means for moving said device to cause the pins to impale the bunches and thereafter remove them from the molds, and means for transferring the molds from which the bunches have been removed from the filled stack supporting means to the empty stack supporting means, substantially as described.

8. The combination with a frame, of means for supporting a stack of two-part filled bunch molds, means for supporting a stack of empty bunch molds, means for opening and closing the filled molds in succession, a bunch removing device said device including a plurality of impaling pins, means for moving said device to cause the pins to impale the bunches and thereafter remove them from the molds, and means for transferring the molds that have been emptied from the filled stack supporting means to the empty stack supporting means, substantially as described.

9. The combination with a bunch support, of a bunch removing device, means for locking said device in a predetermined position, and means for operating said device while in locked position to cause it to engage a bunch and to thereafter remove it from the support, substantially as described.

10. The combination with means for supporting a bunch mold operating to sustain a plurality of bunches, of a bunch removing device comprising a plurality of impaling pins, means for locking the pins in a predetermined position, means for moving them while in locked position to cause them to engage the bunches, and means for operating them to remove the bunches from the mold, substantially as described.

11. The combination with a frame, of means for supporting a stack of two-part filled bunch molds therein, means for supporting a stack of empty molds, a bunch removing device including a plurality of impaling pins, means for locking said device in a predetermined position, means for moving said device while in locked position to cause the pins to impale the bunches of the lowermost mold of the stack, means for thereafter operating the device to cause the pins to remove the bunches from the mold, means for separating and uniting the parts of said mold, and means for transferring the mold from the filled stack supporting means to the empty stack supporting means, substantially as described.

12. The combination with bunch mold supporting means operating to hold the mold in a stationary position, of a carriage, a bunch removing device carried thereby, means for giving the carriage a movement toward the mold to cause said removing device to engage the bunches, and means for moving the carriage away from the mold, substantially as described.

13. The combination with bunch mold supporting means operating to hold the mold in a stationary position, of a carriage, a bunch removing device carried thereby said bunch removing device comprising a plurality of impaling pins, means for moving the carriage toward the mold to cause the pins to engage the bunches, and means for moving the carriage away from the mold, substantially as described.

14. The combination with means for sustaining a two-part mold in a stationary position, of a carriage, a bunch removing device carried thereby, means for giving the carriage a movement toward the mold to cause the bunch removing device to engage the bunches, means for opening the mold, means for withdrawing the carriage, and means for reuniting the parts of the mold, substantially as described.

15. The combination with means for sustaining a two-part mold in a stationary position, of a carriage, a bunch removing device carried thereby said removing device comprising a plurality of impaling pins, means for moving the carriage toward the mold to cause the pins to engage the bunches, means for opening the mold, means for withdrawing the carriage, and means for reuniting the parts of the mold, substantially as described.

16. The combination with bunch mold supporting means, of a carriage, a bunch removing device carried thereby, a locking device for holding the bunch removing device stationary with respect to the carriage, means for giving the carriage a movement toward the mold to cause said removing device to engage the bunches, and means for moving the carriage away from the mold, substantially as described.

17. The combination with means for sustaining a two-part mold in position, of a carriage, a bunch removing device carried thereby, a locking device for holding the bunch removing device stationary with respect to the carriage, means for giving the carriage a movement toward the mold to cause the bunch removing device to engage the bunches, means for opening the mold, means for withdrawing the carriage, and means for reuniting the parts of the mold, substantially as described.

18. The combination with means for supporting a stack of two-part molds in position, of a carriage, a bunch removing device carried thereby, means for giving the carriage a movement to cause said removing device to engage the bunches of the lowermost mold of the stack while the mold is in position in the stack, means for separating the lower part of said mold from the upper part, means for operating the bunch removing device to cause it to free the bunches from the upper part of said separated mold, means for giving the carriage a movement to carry the bunches away from the mold, means for reuniting the parts of the mold, and means for discharging said mold, substantially as described.

19. The combination with means for supporting a stack of two-part molds in position, of a carriage, a bunch removing device carried thereby, said device comprising a plurality of impaling pins, means for giving the carriage a movement to cause said impaling pins to engage the bunches of the lowermost mold of the stack while the mold is in position in the stack, means for separating the lower part of said mold from the upper part, means for operating the bunch removing device to cause it to free the bunches from the upper part of said separated mold, means for giving the carriage a movement to carry the bunches away from the mold, means for reuniting the parts of the mold, and means for discharging said mold, substantially as described.

20. The combination with means for supporting a mold, of a carriage, a shaft mounted in the carriage, a series of impaling pins carried by the shaft, means for reciprocating the carriage, means for operating the shaft, a locking device mounted on the carriage for holding the impaling pins in a predetermined position, and means for operating the locking device, substantially as described.

21. The combination with means for sustaining a two-part mold in position and for separating the parts thereof, of a carriage, a shaft mounted on the carriage, a series of impaling pins mounted on the shaft, means for reciprocating the carriage, and means for operating the shaft, said means being constructed to give the pins a downward movement after they have been engaged with the bunches and later an upward movement, substantially as described.

22. The combination with means for sustaining a two-part mold in position and for separating the parts thereof, of a carriage, a shaft mounted on the carriage, a series of impaling pins mounted on the shaft, means for reciprocating the carriage, means for operating the shaft, said means being constructed to give the pins a downward movement after they have been engaged with the bunches and later an upward movement, a locking device mounted on the carriage for holding the impaling pins in a predetermined position, and means for operating the locking device, substantially as described.

23. The combination with an abutment for sustaining a stack of two-part molds, of means coöperating therewith to secure the lower part of the lowermost mold to the abutment, a supporting device for the upper part of the lowermost mold and the stack, and means for producing a relative movement between the abutment and the supporting device, substantially as described.

24. The combination with an abutment for sustaining a stack of two-part molds, of means coöperating therewith to secure the lower part of the lowermost mold to the abutment, a supporting device for the upper part of the lowermost mold and the stack, means for producing a relative movement between the abutment and the supporting device, and a bunch removing device, substantially as described.

25. The combination with an abutment for sustaining a stack of two-part molds, of means coöperating therewith to secure the lower part of the lowermost mold to the abutment, supports constructed to engage the upper part of the lowermost mold of the stack and the lower part of a mold above it, means for moving said supports into and out of operative position, means for producing a relative movement between said supports and the abutment, and means for removing the lowermost mold from the abutment, substantially as described.

26. The combination with an abutment for sustaining a stack of two-part molds, of means coöperating therewith for securing the lower part of the lowermost mold to the abutment, supporting devices for the upper part of the lowermost mold and the stack, means for producing a relative movement between said supporting devices and the abutment, and means for removing the lowermost mold of the stack, substantially as described.

27. The combination with an abutment for sustaining a stack of two-part filled molds, of pivoted hooks for engaging the molds, means for giving the abutment a reciprocating movement, a pair of supports each of said supports having two engaging projections, means for operating the supports, and bunch removing means, substantially as described.

28. The combination with an abutment for sustaining a stack of two-part filled molds, of pivoted hooks for engaging the molds, means for giving the abutment a reciprocating movement, a pair of supports each of said supports having two engaging projections, means for operating the supports, bunch removing means, and a mold transferrer, substantially as described.

29. The combination with an abutment operating to sustain a stack of molds, of retaining means coöperating therewith, a pair of supports, each of said supports having two operating projections, means for moving said supports into and out of engagement with the molds of the stack, means for producing a relative movement between the supports and the abutment to open the mold, a bunch removing device said device including a plurality of impaling pins, and a mold transferrer, substantially as described.

30. The combination with an abutment for sustaining a stack of two-part molds, of retaining means coöperating therewith, suitable stack holders, means for moving the abutment toward and away from the stack holders, bunch removing means, a mold transferrer, and mold stacking mechanism, substantially as described.

31. The combination with an abutment for sustaining a stack of two-part molds, of retaining means coöperating therewith, suitable stack holders, means for moving the abutment toward and away from the stack holders, bunch removing means, a mold transferrer, and mold stacking mechanism comprising a lifting device and suitable supports, substantially as described.

32. The combination with an abutment for sustaining a stack of two-part molds, of retaining means coöperating therewith, a pair of stack holders each of said stack holders having two engaging projections, means for moving the abutment toward and away from the stack holders, bunch removing means, a mold transferrer, and mold stacking mechanism, substantially as described.

33. The combination with an abutment for sustaining a stack of two-part molds, of retaining means coöperating therewith, a pair of stack holders each of said stack holders having two engaging projections, means for moving the abutment toward and away from the stack holders, bunch removing means, a mold transferrer, and mold stacking mechanism comprising a lifting device and suitable supports, substantially as described.

34. The combination with an abutment for sustaining a stack of two-part molds, of retaining means coöperating therewith, a pair of stack holders each of said stack holders having two engaging projections, means for moving the abutment toward and away from the stack holders, bunch removing means, said means including a plurality of impaling pins, a mold transferrer, and mold stacking mechanism, substantially as described.

35. The combination with an abutment for sustaining a stack of two-part molds, of retaining means coöperating therewith, a pair of stack holders each of said stack holders having two engaging projections, means for moving the abutment toward and away from the stack holders, bunch removing means said means including a plurality of impaling pins, a mold transferrer, and mold stacking mechanism comprising a lifting device and suitable supports, substantially as described.

36. The combination with a frame, of bunch removing means, guides for a stack of filled bunch molds, said guides being arranged to provide an opening through which the molds may be introduced into the guides, means for lowering the stack of molds and for opening and closing the lowermost mold, a mold transferrer, and stacking mechanism for the empty molds said mechanism including a pair of movable guides located in front of the opening through which the molds are introduced into the guides for the filled molds, and means for swinging said guides out of the way when the filled molds are to be introduced, substantially as described.

37. The combination with a frame, of bunch removing means, guides for a stack of filled bunch molds, said guides being arranged to provide an opening through which the molds may be introduced into the guides, means for lowering the stack of molds and for opening and closing the lowermost mold, a mold transferrer, stacking mechanism including a pair of movable guides which when in operative position are in front of the space through which the molds are introduced into the guides for the filled molds, said guides being constructed to be brought into operative position by the introduction of the molds thereinto, and means for automatically moving the guides out of position when the molds are removed therefrom, substantially as described.

38. The combination with a frame, of bunch removing means, guides for a stack of filled bunch molds, said guides being arranged to provide an opening through which the molds may be introduced into the guides, means for lowering the stack of molds and for opening and closing the lowermost mold, a mold transferrer, and stacking mechanism including a pair of pivoted spring-controlled guides said guides being arranged to be moved into operative position by the introduction of the molds thereinto and moved out of operative position by the spring when the molds are removed therefrom, substantially as described.

39. In a machine for removing bunches from molds, the combination with suitable guides for a descending stack of molds, of suitable guides for an ascending stack of molds, means for successively opening the molds in the descending stack and removing the bunches therefrom and for closing the molds after the bunches have been removed, means for transferring the molds to the guides for the empty stack, said guides being so arranged that the stacks move at an acute angle to the vertical, substantially as described.

In testimony whereof, we have hereunto set our hands in the presence of two subscribing witnesses.

OLUF TYBERG.
LEON LAKE.

Witnesses:
SYDNEY IRVIN PRESCOTT,
FRANK H. VICK.